US011802084B2

United States Patent
Xue et al.

(10) Patent No.: US 11,802,084 B2
(45) Date of Patent: Oct. 31, 2023

(54) ROCK SIMILAR MATERIAL SATISFYING WATER-INDUCED STRENGTH DEGRADATION CHARACTERISTIC AND PREPARATION METHOD AND USE THEREOF

(71) Applicant: Institute of Geology and Geophysics, Chinese Academy of Sciences, Beijing (CN)

(72) Inventors: Lei Xue, Beijing (CN); Yuan Cui, Beijing (CN); Chao Xu, Beijing (CN); Mengyang Zhai, Beijing (CN); Ke Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/950,038

(22) Filed: Sep. 21, 2022

(65) Prior Publication Data
US 2023/0167026 A1    Jun. 1, 2023

(30) Foreign Application Priority Data
Nov. 30, 2021 (CN) .......................... 202111444973.0

(51) Int. Cl.
*C04B 11/28*      (2006.01)
*C04B 14/06*      (2006.01)
(Continued)

(52) U.S. Cl.
CPC .............. *C04B 28/14* (2013.01); *C04B 11/28* (2013.01); *C04B 14/06* (2013.01); *C04B 14/104* (2013.01);
(Continued)

(58) Field of Classification Search
CPC ......... C04B 28/14; C04B 11/28; C04B 14/06; C04B 14/104; C04B 14/368; C04B 40/0042; C04B 40/0071; C04B 2103/22; C04B 2111/00991; C04B 11/00; C04B 11/30; C04B 14/00; C04B 2103/20; C04B 28/04; C04B 28/02; C04B 2201/20; C04B 2201/50; C04B 2111/542; C04B 14/28;
(Continued)

(56) References Cited

FOREIGN PATENT DOCUMENTS

| CN | 101614629 A | * 12/2009 |
| CN | 101614629 A |   12/2009 |

(Continued)

OTHER PUBLICATIONS

CN-101614629-A, machine translation (Year: 2009).*

(Continued)

*Primary Examiner* — Bryan D. Ripa
*Assistant Examiner* — Marites A Guino-O Uzzle
(74) *Attorney, Agent, or Firm* — Thomas | Horstemeyer, LLP

(57) ABSTRACT

Disclosed is a rock similar material satisfying a water-induced strength degradation characteristic and a preparation method and use thereof. The rock similar material satisfying the water-induced strength degradation characteristic includes an aggregate, a cementing material, and an additive, where the aggregate includes quartz sand, barite powder, and bentonite, and the cementing material includes cement and gypsum.

9 Claims, 5 Drawing Sheets

(51) Int. Cl.
  *C04B 14/10* (2006.01)
  *C04B 14/36* (2006.01)
  *C04B 28/14* (2006.01)
  *C04B 40/00* (2006.01)
  *C04B 28/04* (2006.01)
  *C04B 103/22* (2006.01)
  *C04B 111/00* (2006.01)

(52) U.S. Cl.
  CPC ............ *C04B 14/368* (2013.01); *C04B 28/04* (2013.01); *C04B 40/0042* (2013.01); *C04B 40/0071* (2013.01); *C04B 2103/22* (2013.01); *C04B 2111/00991* (2013.01); *C04B 2201/20* (2013.01); *C04B 2201/50* (2013.01)

(58) Field of Classification Search
  CPC ......... C04B 22/142; C04B 7/02; C04B 22/16; C04B 24/14
  See application file for complete search history.

(56) References Cited

FOREIGN PATENT DOCUMENTS

| CN | 104119061 | A | * | 10/2014 | |
|---|---|---|---|---|---|
| CN | 104692734 | A | * | 6/2015 | |
| CN | 107840629 | A | * | 3/2018 | ............. C04B 28/14 |
| CN | 110642583 | A | * | 1/2020 | |
| CN | 112113813 | A | | 12/2020 | |
| CN | 112408839 | A | * | 2/2021 | ......... C04B 40/0039 |

OTHER PUBLICATIONS

CN-107840629-A, machine translation (Year: 2018).*
CN-112408839-A, machine translation (Year: 2021).*
CN-110642583-A, machine translation (Year: 2020).*
CN-104692734-A, machine translation (Year: 2015).*
CN-104119061-A, machine translation (Year: 2014).*
Zhang Qiang-yong et al., "Research and development of new typed cementitious geotechnical similar material for iron crystal sand and its application", Rock and Soil Mechanics, vol. 29, No. 8, Aug. 2008, 5 pages.
Han Boli et al., "Research on Similar Material of Rockmass", J. Wuhan Univ. of Hy dr. & Elec. Eng., vol. 30, No. 2, Apr. 1997, 4 pages.
Xiao Jie et al., "Research on Water-physical Properties of Rock Similar Materials", Geotechnical Engineering Technique, vol. 29, No. 3, Jun. 2015, 4 pages.
Wang Hanpeng et al., "Development of a new geomechanical similar material", Chinese Journal of Rock Mechanics and Engineering, vol. 25, No. 9, Sep. 2006, 6 pages.
E. Fumagalli, Statical and geomechanical model-network link: https://www.doc88.com/p-7052367140621.html, Springer-Verlag Wien GmbH, 1973.
Kim et al., "Model testing of closely spaced tunnels in clay", Geotechnique 48, No. 3, 375-388, 1998.
Ma Fangping et al., "NIOS model material and its use in geomechanical similarity model test", Journal of Hydroelectric Engineering, vol. 23, No. 1, Feb. 2004, 4 pages.

* cited by examiner

ROCK SIMILAR MATERIAL SATISFYING WATER-INDUCED STRENGTH DEGRADATION CHARACTERISTIC AND PREPARATION METHOD AND USE THEREOF

CROSS REFERENCE TO RELATED APPLICATION

The present application claims the benefit and priority of Chinese Patent Application No. 202111444973.0, entitled "Rock similar material satisfying water-induced strength degradation characteristic and preparation method and use thereof" filed on Nov. 30, 2021, the disclosure of which is incorporated by reference herein in its entirety as part of the present application.

TECHNICAL FIELD

The present disclosure relates to the field of geological engineering technologies, and in particular, to a rock similar material satisfying a water-induced strength degradation characteristic and a preparation method and use thereof.

BACKGROUND ART

Due to the impact on the human society, landslides have become environmental disasters that cannot be ignored, and landslide hazards have become the second natural disasters after earthquakes. The evolution and development of landslides are not only closely related to geological conditions such as topography, landform, and geological structures, but also closely related to induction factors such as rainfall, earthquakes, and human activities. Landslides triggered by the rainfall are the most widely distributed, occur most frequently, and result in the biggest hazards, which account for approximately 80% of total landslides. The rock landslide triggered by rainfall often causes significant economic losses and casualties that are far greater than other types of landslides due to the characteristics of large scale, fast sliding, and suddenness. Therefore, it is of great significance to study the law of water-induced rock landslide strength degradation.

Currently, commonly used methods for studying the law of water-induced rock slope strength degradation include theoretical analysis, field observation, numerical simulation, and a physical model experiment. A theoretical basis of the physical model experiment is a similarity theory. The physical model experiment is conducted by a process comprising: analyzing dimension to obtain a similarity criterion, creating a model by using a similar material to realize a connection between the model and a prototype, and testing the model. The prototype is obtained through reverse deduction according to the similarity criterion by using the test result, to reveal a formation mechanism thereof and guide engineering design. The physical model experiment is a vivid, intuitive, and accurate physical research method, and has been widely applied in revealing a landslide evolution law, an instability mechanism, and the like. Correct selection and appropriate proportioning of a similar material for the model are a basis and a success key for carrying out the model experiment, and are of great significance.

Since the development of geomechanical model experiments, scholars at home and abroad have carried out a lot of research on properties of a proportioning experiment of a rock similar material. At an early stage, Lin Yunmei (referring to: Lin Yunmei. Experimental rock mechanics-simulation research. Beijing: Coal Industry Press, 1984), Gu Dazhao (referring to: Gu Dazhao. Similar material and similar model. Xuzhou: China University of Mining and Technology Press, 1995), Han Boli (referring to: Han Boli, Chen Xialing, Song Yile, et al. Research on similar material of rock mass. Journal of Wuhan University of Hydraulic and Electric Power, 1997, (02): 7-10.), Fumagalli (referring to: FUMAGALLI E. Statical and geomechanical model. NewYork: Springer, 1973.), Kim (referring to: KIM S H, BURD H J, MILLIGAN G W E. Model testing of closely spaced tunnels in clay. Geotechnique, 1998, 48(3).), etc. make a lot of attempts on rock similar materials suitable for simulating rocks, and determine a basic principle of raw material selection and combination. With the development of model experiment methods, more raw materials are used to prepare different types of rocks. Ma Fangping et al. disclose a NIOS model material, including magnetite powder and natural river sand as main components, and gypsum or cement as a cementing agent (referring to: Ma Fangping, Li Zhongkui, Luo Guangfu. NIOS model material and its application in a geomechanical similarity model test. Journal of Hydropower Generation, 2004, (01): 48-51.). Wang Hanpeng et al. disclose a new similar material for a geomechanical model test, including iron ore powder, barite powder, and quartz sand as an aggregate, a rosin-alcohol solution as a cementing agent, and gypsum as a regulator (referring to: Wang Hanpeng, Li Shucai, Zhang Qiangyong, et al. Research and development of new similar material for geomechanical model test. Chinese Journal of Rock Mechanics and Engineering, 2006, 25(09): 1842-1847.). Zhang Qiangyong et al. disclose a new cementitious geotechnical similar material for iron crystal sand, including iron ore powder, barite powder, and quartz sand as an aggregate, a rosin-alcohol solution as a cementing agent, and gypsum powder as a regulator (referring to: Zhang Qiangyong, Li Shucai, Guo Xiaohong, et al. Research and development of new typed cementitious geotechnical similar material for iron crystal sand and its application. Geotechnical Mechanics, 2008, (08): 2126-2130.). Xiao Jie et al. disclose a rock similar material, including cement and gypsum as cementing agents, and quartz sand as an aggregate (referring to: Xiao Jie, Liu Baoguo. Research on water-physical properties of rock similar materials. Geotechnical Engineering Technology, 2015, 29(03): 114-117.). The patent CN202010942983.6 discloses a limestone similar material, which includes an aggregate, a cementing material, and an additive, wherein the aggregate includes standard sand, quartz powder, and iron powder, the cementing material includes Portland cement, sulfoaluminate cement, gypsum, or silicon powder, and the additive includes a water reducer, boric acid, and purified water. In the above prior arts, the research on some new geotechnical similar materials has been made by using different raw materials and proportions, and many engineering problems have been resolved by using model experiment methods, which greatly enriches the research on rock similar materials, and lays a foundation for subsequent model experiment research.

The above similar materials are mainly used to simulate hard rocks. Although these similar materials have softening properties similar to those of rocks at specific ratios and under specific curing conditions, they are usually hard to be disintegrated when being in contact with water. During some large-scale physical model experiments of rock landslides, it is difficult to cause sliding or destruction. Consequently, it is difficult to obtain a law of water-induced rock slope strength degradation.

SUMMARY

In view of this, the present disclosure is to provide a rock similar material satisfying a water-induced strength degradation characteristic and a preparation method and use thereof. The rock similar material satisfying the water-induced strength degradation characteristic provided in the present disclosure is sensitive and easy to disintegrate when being in contact with water, and can be used to well simulate a strength degradation characteristic of a rock when the rock is in contact with water.

To achieve the above object, the present disclosure provides the following technical solutions:

Provided is a rock similar material satisfying a water-induced strength degradation characteristic, including an aggregate, a cementing material, and an additive, wherein the aggregate includes quartz sand, barite powder, and bentonite, and the cementing material includes cement and gypsum.

In some embodiments, a mass ratio of the aggregate to the cementing material is in the range of 4:1 to 8:1.

In some embodiments, a mass ratio of the cement to the gypsum in the cementing material is in the range of 3:7 to 7:3.

In some embodiments, the additive includes a gypsum retarder.

In some embodiments, a mass fraction of the barite powder in the rock similar material is in the range of 13-35%.

In some embodiments, a mass fraction of the bentonite in the rock similar material is in the range of 10-40%.

In some embodiments, a mass fraction of montmorillonite in the bentonite is greater than 80%.

Also provided is a method for preparing the rock similar material satisfying the water-induced strength degradation characteristic in the foregoing technical solutions, including the following steps:

mixing the aggregate, the cementing material, the additive, and water to obtain a mixture, molding the mixture to obtain a molded sample, and curing the molded sample, to obtain the rock similar material satisfying the water-induced strength degradation characteristic.

In some embodiments, the molding is performed at a pressure of 5-20 MPa for 5-10 min.

In some embodiments, the curing is performed at ambient temperature with a humidity of 50-60% for 8-10 days.

Also provided is use of the rock similar material satisfying the water-induced strength degradation characteristic in the foregoing technical solutions or the rock similar material satisfying the water-induced strength degradation characteristic obtained by the above method in a compressive experiment, a direct shear experiment, or a physical simulation experiment.

In some embodiments, the use includes use in simulating water-induced strength degradation of a rock slope.

The present disclosure provides a rock similar material satisfying a water-induced strength degradation characteristic, including an aggregate, a cementing material, and an additive, wherein the aggregate includes quartz sand, barite powder, and bentonite, and the cementing material includes cement and gypsum. In the present disclosure, the bentonite is used as a water-sensitive modifier. A main mineral component of the bentonite is montmorillonite, which has a relatively strong water absorbability, and expands rapidly after absorbing water, so that the rock similar material satisfying the water-induced strength degradation characteristic could be easily disintegrated when being in contact with water. In addition, the quartz sand and the barite powder are used as the aggregate, and the cement and the gypsum are used as the cementing material, which not only ensures that the rock similar material satisfying the water-induced strength degradation characteristic is sensitive and easy to disintegrate when being in contact with water, but also improves a bulk density and mechanical properties of the rock similar material satisfying the water-induced strength degradation characteristic, thereby making it possible to well simulate a strength degradation characteristic of a rock when the rock is in contact with water. It can be learned from results in examples that, the rock similar material satisfying the water-induced strength degradation characteristic provided in the present disclosure has a density of 1.95-2.18 g/cm$^3$, and a relatively high weight, which can better satisfy different types of rock masses whose weight similarity ratio is 1, so that the conversion of a similarity ratio between a model and a prototype can be simplified, thereby simplifying model fabrication. The rock similar material satisfying the water-induced strength degradation characteristic prepared in the present disclosure has a compressive strength of 10.38-25.55 MPa, an elastic modulus of 1.63-5.75 GPa, a tensile strength of 0.91-2.46 MPa, an internal friction angle of 32.74-54.66°, a cohesion of 2.18-8.94 MPa, and a Poisson's ratio of 0.10-0.18. These results shows that the rock similar material satisfying the water-induced strength degradation characteristic prepared in the present disclosure has a relatively wide adjustable range of mechanical parameters, making it possible to satisfy requirements of various rock mass model tests for similar materials, and could be applied to a compressive experiment, a direct shear experiment, and/or a physical model experiment. The rock similar material satisfying the water-induced strength degradation characteristic prepared in the present disclosure has a high disintegration degree after being soaked in water for 4 hours.

The present disclosure provides a method for preparing the rock similar material satisfying the water-induced strength degradation characteristic in the foregoing technical solutions. The method provided in the present disclosure has a simple operation, cheap and easily accessible raw materials, low production costs, and environmental friendliness.

DETAILED DESCRIPTION OF THE EMBODIMENTS

Figure 1:
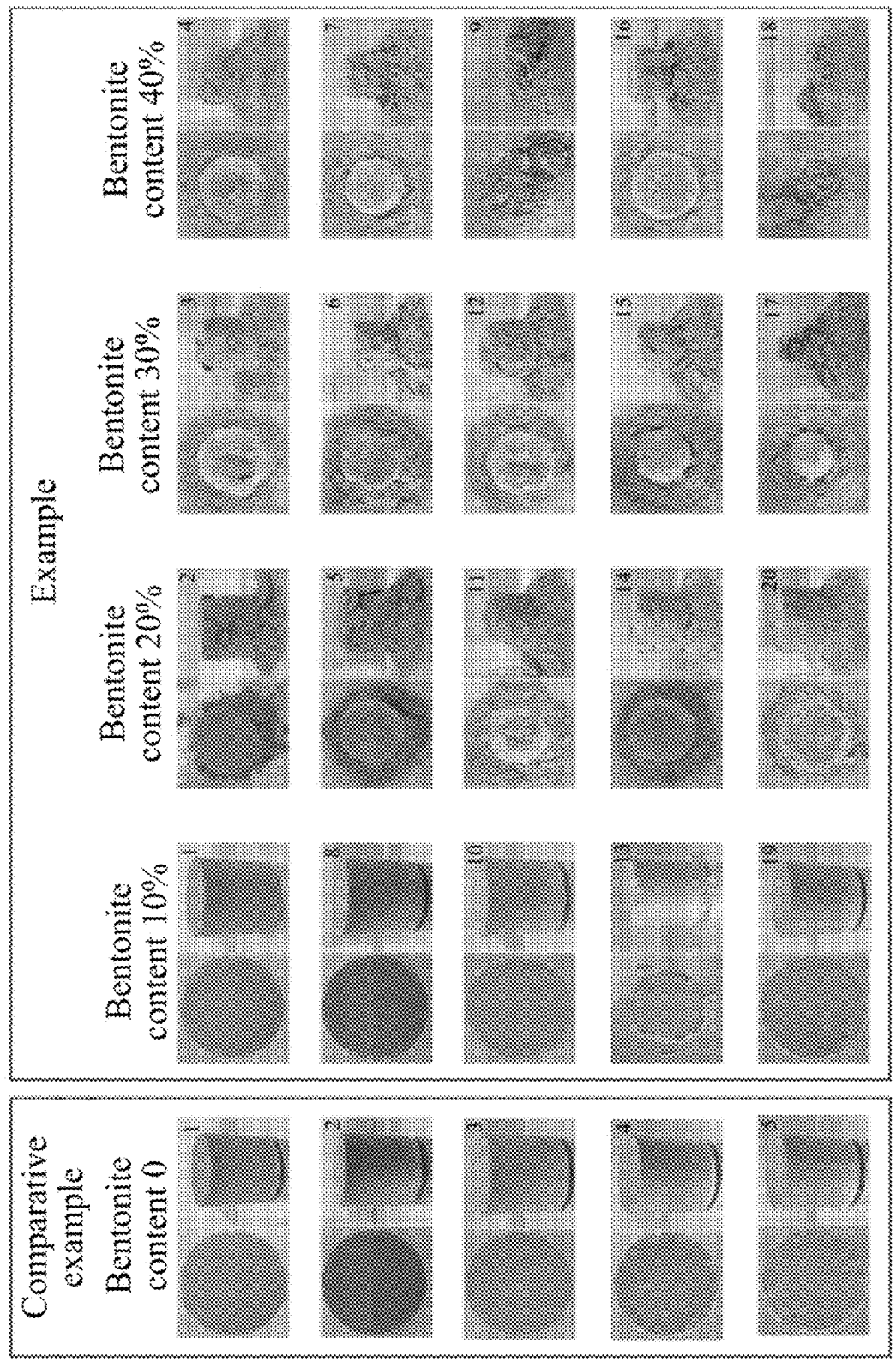
FIG. 1 is a diagram showing disintegration results of the rock similar material satisfying the water-induced strength degradation characteristic as prepared in Examples 1-20 and Comparative Examples 1-5.

The present disclosure provides a rock similar material satisfying a water-induced strength degradation characteristic, including an aggregate, a cementing material, and an additive, wherein the aggregate includes quartz sand, barite powder, and bentonite, and the cementing material includes cement and gypsum.

In the present disclosure, unless otherwise specified, all raw materials are commercially available products well known to those skilled in the art.

In the present disclosure, the aggregate includes quartz sand, barite powder, and bentonite. In some embodiments, the quartz sand has a granularity of 20-70 meshes. In some embodiments, the quartz sand includes coarse quartz sand and fine quartz sand. In some embodiments, the coarse quartz sand has a granularity of 20-40 meshes. In some embodiments, the fine quartz sand has a granularity of 40-70 meshes. In some embodiments, a mass ratio of the coarse quartz sand to the fine quartz sand is in the range of 1:1 to 3:1, preferably 1:1 to 2:1.

In some embodiments, a granularity of the barite powder is 150-300 meshes, preferably 200-250 meshes. In some embodiments, a mass fraction of the barite powder in the rock similar material satisfying the water-induced strength degradation characteristic is 13-35%, preferably 15-35%, and more preferably 20-30%. In the present disclosure, the quartz sand and the barite powder are used as the aggregate, which could not only ensure that the rock similar material has a characteristic of a high bulk density, but also better adjust mechanical properties of the rock similar material satisfying the water-induced strength degradation characteristic.

In some embodiments, a mass fraction of montmorillonite in the bentonite is greater than 80%, preferably 90-100%. In some embodiments, a mass fraction of the bentonite in the rock similar material satisfying the water-induced strength degradation characteristic is 10-40%, preferably 15-35%, and more preferably 20-30%. In some embodiments, a granularity of the bentonite is 300-500 meshes, preferably 400-450 meshes. A main mineral component of the bentonite is montmorillonite, which has relatively strong water absorbability, and expands rapidly after absorbing water, so that the rock similar material satisfying the water-induced strength degradation characteristic could be disintegrated. Under the condition that the content of the bentonite is excessively low, the water sensitivity of the similar material is decreased, and the strength of the similar material is not easily degraded; and under the condition that the content of the bentonite is excessively high, the water sensitivity of the similar material is excessively high, and the similar material is extremely easily disintegrated. In the present disclosure, the bentonite is used as one of aggregates, which could adjust the water sensitivity of the rock similar material satisfying the water-induced strength degradation characteristic and reduce a bulk density and mechanical properties of the rock similar material.

In the present disclosure, the cementing material includes the cement and the gypsum. In some embodiments, the cement includes one or more selected from the group consisting of C425 Portland cement and C525 Portland cement, preferably C425 ordinary Portland cement. In some embodiments, the gypsum is raw gypsum. A granularity of the gypsum is 100-200 meshes, preferably 120-150 meshes. In some embodiments, a mass ratio of the cement to the gypsum in the cementing material (cement-gypsum ratio) is in the range of 3:7 to 7:3, preferably 4:6 to 6:4. In the present disclosure, the cement and the gypsum at the above proportion are used as the cementing material, which could increase a cementation degree of the similar material, and improve mechanical properties such as strength of the rock similar material satisfying the water-induced strength degradation characteristic while ensuring compactness of the rock similar material.

In some embodiments, a mass ratio of the aggregate to the cementing material is in the range of 4:1 to 8:1, preferably 3:1 to 7:1. In the present disclosure, the mass ratio of the aggregate to the cementing material (aggregate-cement ratio) is controlled within the above range, which is beneficial to formation of a rock similar material with a wide range of physical and mechanical parameters, enabling the rock similar material to be applied to more rock slope model experiment researches.

In some embodiments, the additive includes a gypsum retarder. There is no particular limitation to the type of the gypsum retarder, and any gypsum retarder well known to those skilled in the art may be used. For example, the gypsum retarder is one or more selected from the group consisting of a water-soluble organic acid salt, an alkaline phosphate, and a vegetable protein retarder, preferably a vegetable protein retarder. There is no particular limitation to the type of the water-soluble organic acid salt, the alkaline phosphate, and the vegetable protein retarder, and any water-soluble organic acid salt retarder, alkaline phosphate retarder, and vegetable protein retarder well known to those skilled in the art may be used. In some embodiments, a mass of the additive is 0.1-3% of a total mass of the rock similar material satisfying the water-induced strength degradation characteristic, preferably 0.1-0.2%. In the present disclosure, the gypsum retarder is used to better control a gypsum setting time, helping to prepare the rock similar material satisfying the water-induced strength degradation characteristic.

The present disclosure provides a method for preparing the rock similar material satisfying the water-induced strength degradation characteristic in the foregoing technical solutions, including the following steps:

mixing the aggregate, the cementing material, the additive, and water to obtain a mixture, molding the mixture to obtain a molded sample, and curing the molded sample, to obtain the rock similar material satisfying the water-induced strength degradation characteristic.

In some embodiments, a mass of the water is 10-15% of the total mass of the aggregate, the cementing material, and the additive, preferably 11-12%.

In some embodiments, the mixing is performed by a stirring. There is no particular limitation to the stirring speed and stirring time, as long as the raw materials could be mixed uniformly. In some embodiments, the mixing is conducted by first mixing the aggregate and the cementing material to obtain a dry mixture, second mixing the additive and water to obtain an additive solution, and third mixing the dry mixture and the additive solution to obtain a wet mixture. In some embodiments, after the third mixing, the present disclosure further includes sieving the wet mixture. There is no particular limitation to the sieving, as long as a granularity of the sieved wet mixture could be not more than 2 mm.

In some embodiments, the molding is performed at a pressure of 5-20 MPa, preferably 10-15 MPa. In some embodiments, the molding is performed at a temperature of 15-30° C., preferably 20-25° C. In examples of the present disclosure, the molding is performed at ambient temperature. In some embodiments, the molding is performed for 5-10 min, preferably 8 min. In some embodiments, the molding is compression molding. In some embodiments, the molding is performed by filling the wet mixture into a mold and then placing the mold in a hydraulic demolding apparatus. There is no particular limitation to the material of the mold, and any mold well known to those skilled in the art may be used, for example, a steel mold. In some embodiments, the mold is cleaned before use and then coated with a release agent. In some embodiments, the cleaning is water washing. There is no particular limitation to the type and amount of the release agent, and any type and amount of the release agent that are well known to those skilled in the art may be used, for example, lubricating oil and/or vaseline. There is no particular limitation to the hydraulic demolding apparatus, and any hydraulic demolding apparatus well known to those skilled in the art may be used. In examples of the present disclosure, in the molding process, the wet mixture is filled into the mold at three layers, and a scratch is made at a layering position to prevent obvious stratification of a standard sample of the similar material. After being compacted, the wet mixture is placed in the hydraulic demolding apparatus and left standing for molding, then decompressed to prevent the material from rebounding greatly, and demolded after standing. In some embodiments, the standing is performed at ambient temperature for 20-30 min, preferably 25 min.

In some embodiments, the curing is performed at ambient temperature. In some embodiments, the curing is performed at a humidity of 50-60%, preferably 55%. In some embodiments, the curing is performed for 8-12 days, preferably 10-11 days, and more preferably 10 days.

In the present disclosure, by adjusting a proportion of various raw materials, the rock similar material satisfying the water-induced strength degradation characteristic could be obtained, which has a relatively wide variation range of mechanical parameters and stable mechanical properties, making it possible to meet requirements of different types of geotechnical media for similar materials, and reduce difficulty in researching a model experiment. In addition, the present disclosure has a wide source of raw materials and low costs, greatly reducing model experiment costs. The method has a simple preparation process and a short preparation cycle, which could increase a fabrication speed of a large-scale similar material model. The raw materials have no toxic and side effects, do not cause any harm to human body, and are safe and environmentally friendly.

The present disclosure further provides use, in a compressive experiment, a direct shear experiment, or a physical simulation experiment, of the rock similar material satisfying the water-induced strength degradation characteristic in the foregoing technical solutions or the rock similar material satisfying the water-induced strength degradation characteristic obtained by the method in the foregoing technical solutions. In some embodiments, the use includes use in simulating water-induced strength degradation of a rock slope. The rock similar material satisfying the water-induced strength degradation characteristic provided in the present disclosure has relatively strong water sensitivity, is easy to disintegrate when being in contact with water, and could satisfy requirements of water-induced strength degradation. By adjusting a proportion of various raw materials, the rock similar material satisfying the water-induced strength degradation characteristic has a relatively wide variation range of mechanical parameters and stable mechanical properties, which could meet requirements of different types of geotechnical media for similar materials, and reduce difficulty in researching a model experiment.

The technical solutions in the present disclosure are clearly and completely described below with reference to examples in the present disclosure. It is clear that the described examples are merely a part, rather than all of the examples of the present disclosure. All other examples obtained by those skilled in the art based on the examples of the present disclosure without creative efforts shall fall within the protection scope of the present disclosure.

Example 1

222.50 g of quartz sand (a mass ratio of coarse quartz sand with a granularity of 20-40 meshes to fine quartz sand with a granularity of 40-70 meshes was 1:1), 89.00 g of barite powder (with a granularity of 200 meshes), 35.60 g of C425 ordinary Portland cement, 53.40 g of raw gypsum, and 44.50 g of bentonite (with montmorillonite content greater than 80 wt % and a granularity of 400 meshes) were mixed uniformly, and then 55.00 g of a 0.01 g/mL gypsum retarder aqueous solution (vegetable protein gypsum retarder) was added thereto to obtain a wet mixture. The wet mixture was filled, at three layers, into a steel mold washed with water and coated with a lubricant, in which a scratch was made at a layering position. Then, the steel mold was placed in a hydraulic demolding apparatus, subjected to compression molding at 20° C. and 10 Mpa for 8 min, and then decompressed to normal pressure. The steel mold was demolded after standing for 20 min at ambient temperature, and then an obtained material was cured at ambient temperature in a dry condition with good ventilation (with a humidity of 50-60%) for 10 days to obtain a rock similar material satisfying a water-induced strength degradation characteristic.

Examples 2-20

Rock similar materials satisfying a water-induced strength degradation characteristic of Examples 2-20 were prepared according to the method in Example 1, and raw materials in Examples 2-20 are listed in Table 1.

Comparative Examples 1 to 5

Rock similar materials satisfying a water-induced strength degradation characteristic of Comparative Examples 1-5 were prepared according to the method in Example 1, and raw materials in Comparative Examples 1-5 are listed in Table 1.

TABLE 1

Raw materials for preparation of rock similar materials satisfying a water-induced strength degradation characteristic in Examples 1-20 and Comparative Examples 1-5

| Group | Quartz sand/g | Barite powder/g | Bentonite/g | Cement/g | Gypsum/g | Gypsum retarder aqueous solution | Aggregate-cement ratio | Cement-gypsum ratio | Barite content % | Bentonite content % |
|---|---|---|---|---|---|---|---|---|---|---|
| Comparative Example 1 | 289.25 | 66.75 | 0.00 | 26.70 | 62.30 | 55.00 | 4:1 | 3:7 | 15 | 0 |
| Example 1 | 222.50 | 89.00 | 44.50 | 35.60 | 53.40 | 55.00 | 4:1 | 4:6 | 20 | 10 |
| Example 2 | 155.75 | 111.25 | 89.00 | 44.50 | 44.50 | 55.00 | 4:1 | 5:5 | 25 | 20 |
| Example 3 | 89.00 | 133.50 | 133.50 | 53.40 | 35.60 | 55.00 | 4:1 | 6:4 | 30 | 30 |
| Example 4 | 22.25 | 155.75 | 178.00 | 62.30 | 26.70 | 55.00 | 4:1 | 7:3 | 35 | 40 |
| Example 5 | 192.83 | 89.00 | 89.00 | 22.25 | 51.92 | 55.00 | 5:1 | 3:7 | 20 | 20 |
| Example 6 | 126.08 | 111.25 | 133.50 | 29.67 | 44.50 | 55.00 | 5:1 | 4:6 | 25 | 30 |
| Example 7 | 59.33 | 133.50 | 178.00 | 37.08 | 37.08 | 55.00 | 5:1 | 5:5 | 30 | 40 |
| Comparative Example 2 | 215.08 | 155.75 | 0.00 | 44.50 | 29.67 | 55.00 | 5:1 | 6:4 | 35 | 0 |
| Example 8 | 259.58 | 66.75 | 44.50 | 51.92 | 22.25 | 55.00 | 5:1 | 7:3 | 15 | 10 |
| Example 9 | 92.18 | 111.25 | 178.00 | 19.07 | 44.50 | 55.00 | 6:1 | 3:7 | 25 | 40 |
| Comparative Example 3 | 247.93 | 133.50 | 0.00 | 25.43 | 38.14 | 55.00 | 6:1 | 4:6 | 30 | 0 |
| Example 10 | 181.18 | 155.75 | 44.50 | 31.79 | 31.79 | 55.00 | 6:1 | 5:5 | 35 | 10 |
| Example 11 | 225.68 | 66.75 | 89.00 | 38.14 | 25.43 | 55.00 | 6:1 | 6:4 | 15 | 20 |
| Example 12 | 158.93 | 89.00 | 133.50 | 44.50 | 19.07 | 55.00 | 6:1 | 7:3 | 20 | 30 |
| Example 13 | 211.38 | 133.50 | 44.50 | 16.69 | 38.94 | 55.00 | 7:1 | 3:7 | 30 | 10 |
| Example 14 | 144.63 | 155.75 | 89.00 | 22.25 | 33.38 | 55.00 | 7:1 | 4:6 | 35 | 20 |
| Example 15 | 189.13 | 66.75 | 133.50 | 27.81 | 27.81 | 55.00 | 7:1 | 5:5 | 15 | 30 |
| Example 16 | 122.38 | 89.00 | 178.00 | 33.38 | 22.25 | 55.00 | 7:1 | 6:4 | 20 | 40 |
| Comparative Example 4 | 278.13 | 111.25 | 0.00 | 38.94 | 16.69 | 55.00 | 7:1 | 7:3 | 25 | 0 |
| Example 17 | 106.31 | 155.75 | 133.50 | 14.83 | 34.61 | 55.00 | 8:1 | 3:7 | 35 | 30 |
| Example 18 | 150.81 | 66.75 | 178.00 | 19.78 | 29.67 | 55.00 | 8:1 | 4:6 | 15 | 40 |
| Comparative Example 5 | 306.56 | 89.00 | 0.00 | 24.72 | 24.72 | 55.00 | 8:1 | 5:5 | 20 | 0 |
| Example 19 | 239.81 | 111.25 | 44.50 | 29.67 | 19.78 | 55.00 | 8:1 | 6:4 | 25 | 10 |
| Example 20 | 173.06 | 133.50 | 89.00 | 34.61 | 14.83 | 55.00 | 8:1 | 7:3 | 30 | 20 |

Test Example 1

Water Disintegration Performance

The rock similar materials satisfying the water-induced strength degradation characteristic prepared in Examples 1-20 and Comparative Examples 1-5 were processed into φ50 mm×50 mm cylindrical standard samples through pressing, cutting, and grinding. Each cylindrical standard sample had a parallelism of both end faces of not more than 0.002 mm, a perpendicularity of not more than ±0.1 mm/(100 mm), and a surface evenness of not more than ±0.1 mm/(100 mm). Each cylindrical standard sample was soaked in a transparent glass vessel filled with clean water for 4 hours (the mass of the cylindrical standard sample does not change after being soaked for 4 hours). Disintegration results of the cylindrical standard samples obtained after soaking are shown in FIG. 1, and numbers at upper right corners are numbers of the examples and the comparative examples. It can be learned from FIG. 1 that, a cylindrical standard sample of a rock similar material without bentonite is still intact after being soaked for 4 hours, and no obvious disintegration occurs, which is not suitable for research on a model experiment of water-induced strength degradation of a rock slope. With an increase in bentonite content, a disintegration degree of a cylindrical standard sample is increased, which indicates that the rock similar material satisfying the water-induced strength degradation characteristic prepared in the present disclosure has an excellent degradation effect when being in contact with water, and can well overcome a defect that a rock similar material is not easy to soften when being in contact with water.

Test Example 2

Physical and Mechanical Properties Test

The rock similar materials satisfying the water-induced strength degradation characteristic prepared in Examples 1-20 and Comparative Examples 1-5 were processed into φ50 mm×100 mm cylindrical standard samples through pressing, cutting, and grinding. Each cylindrical standard sample had a parallelism of both end faces of not more than 0.002 mm, a perpendicularity of not more than ±0.1 mm/(100 mm), and a surface evenness of not more than ±0.1 mm/(100 mm). Then, a density, an uniaxial compressive strength, an elastic modulus, a Poisson's ratio, a tensile strength, a cohesion, and an internal friction angle of each cylindrical standard sample were tested according to methods in "Standard for test methods of engineering rock mass" (GB/T 50266-2013), "Standard for soil test method" (GB/T 50123-1999), and "Specification of soil test" (SL 237-1999), and test results are listed in Table 2.

TABLE 2

Physical and mechanical properties of the rock similar materials satisfying the water-induced strength degradation characteristic prepared in Examples 1-20 and Comparative Examples 1-5

| Group | Density (g/cm$^3$) | Compressive strength (MPa) | Elastic modulus (GPa) | Poisson's ratio | Tensile strength (MPa) | Internal friction angle (°) | Cohesion (MPa) |
| --- | --- | --- | --- | --- | --- | --- | --- |
| Comparative Example 1 | 2.12 | 17.17 | 5.68 | 0.16 | 1.28 | 60.25 | 4.03 |
| Example 1 | 2.16 | 23.66 | 5.04 | 0.17 | 1.83 | 51.59 | 4.80 |
| Example 2 | 2.10 | 25.55 | 4.60 | 0.16 | 1.70 | 33.18 | 8.94 |
| Example 3 | 2.04 | 22.54 | 3.94 | 0.18 | 1.79 | 52.18 | 6.49 |
| Example 4 | 1.98 | 22.36 | 3.86 | 0.18 | 1.71 | 36.36 | 4.15 |
| Example 5 | 2.09 | 17.07 | 2.42 | 0.15 | 1.53 | 46.00 | 6.12 |
| Example 6 | 2.03 | 15.32 | 2.32 | 0.15 | 1.24 | 38.40 | 6.00 |
| Example 7 | 2.00 | 20.94 | 2.78 | 0.16 | 1.34 | 46.35 | 5.85 |
| Comparative Example 2 | 2.08 | 14.70 | 5.01 | 0.17 | 1.28 | 52.20 | 4.52 |
| Example 8 | 2.18 | 21.33 | 5.75 | 0.17 | 2.46 | 53.41 | 3.77 |
| Example 9 | 1.95 | 14.23 | 1.90 | 0.13 | 0.91 | 42.86 | 3.10 |
| Comparative Example 3 | 2.10 | 17.87 | 4.46 | 0.15 | 1.20 | 45.60 | 4.58 |
| Example 10 | 2.09 | 17.49 | 4.10 | 0.17 | 1.98 | 53.27 | 4.87 |
| Example 11 | 2.14 | 16.99 | 3.34 | 0.17 | 1.66 | 54.66 | 4.60 |
| Example 12 | 2.05 | 22.46 | 3.79 | 0.16 | 1.59 | 45.90 | 4.75 |
| Example 13 | 2.10 | 13.52 | 2.31 | 0.13 | 1.85 | 39.98 | 4.93 |
| Example 14 | 2.04 | 15.65 | 3.26 | 0.16 | 1.45 | 46.59 | 3.67 |
| Example 15 | 2.05 | 15.50 | 2.31 | 0.13 | 1.17 | 48.43 | 2.95 |
| Example 16 | 2.03 | 16.70 | 2.49 | 0.14 | 1.28 | 38.47 | 4.97 |
| Comparative Example 4 | 2.08 | 13.72 | 3.92 | 0.16 | 1.00 | 46.51 | 4.05 |
| Example 17 | 1.96 | 10.38 | 1.66 | 0.13 | 0.96 | 35.84 | 2.81 |
| Example 18 | 1.98 | 10.88 | 1.63 | 0.10 | 0.97 | 32.74 | 2.95 |
| Comparative Example 5 | 2.02 | 7.24 | 2.88 | 0.15 | 1.06 | 47.41 | 2.09 |
| Example 19 | 2.14 | 15.44 | 3.95 | 0.16 | 1.82 | 38.72 | 4.77 |
| Example 20 | 2.06 | 15.08 | 2.63 | 0.17 | 1.70 | 52.93 | 3.42 |

It can be learned from Table 2 that, the densities of the rock similar materials satisfying the water-induced strength degradation characteristic prepared in the present disclosure are 1.95-2.18 g/cm$^3$, which indicates that the rock similar materials satisfying the water-induced strength degradation characteristic prepared in the present disclosure each have a relatively high weight, and can better satisfy rock mass materials whose weight similarity ratio is 1, so that the conversion of a similarity ratio between a model and a prototype can be simplified, thereby simplifying model fabrication. The rock similar material satisfying the water-induced strength degradation characteristic prepared in the present disclosure has a compressive strength of 10.38-25.55 MPa, an elastic modulus of 1.63-5.75 GPa, a tensile strength of 0.91-2.46 MPa, an internal friction angle of 32.74-54.66°, a cohesion of 2.18-8.94 MPa, and a Poisson's ratio of 0.10-0.18. From this, it can be seen that the rock similar material satisfying the water-induced strength degradation characteristic prepared in the present disclosure has a relatively wide adjustable range of mechanical parameters, and can satisfy requirements of various rock mass model tests for similar materials.

Figure 2:
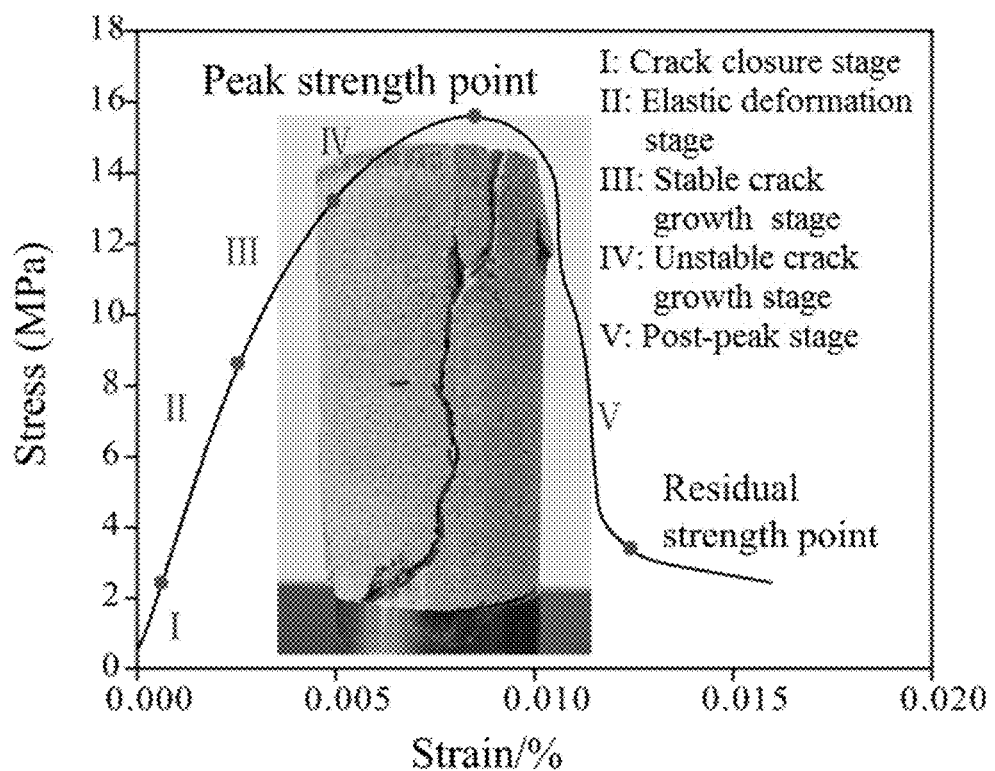
FIG. 2 shows a stress-strain curve of the rock similar material satisfying the water-induced strength degradation characteristic as prepared in Example 15.

FIG. 2 shows a stress-strain curve of the rock similar material satisfying the water-induced strength degradation characteristic prepared in Example 15. It can be learned from FIG. 2 that, for the rock similar material satisfying the water-induced strength degradation characteristic prepared in the present disclosure, five typical stages are presented in a continuous uniaxial loading condition, namely a crack closure stage (I), an elastic deformation stage (II), a stable crack growth stage (III), an unstable crack growth stage (IV), and a post-peak stage (V). This indicates that the rock similar material satisfying the water-induced strength degradation characteristic prepared in the present disclosure has good elastoplasticity, a typical failure characteristic that is highly similar to that of a natural rock mass, and a stress-strain curve that is similar to that of a primary rock, so that the rock similar material can better reflect mechanical properties of the natural rock mass, and is a good substitute for the primary rock.

Figure 3:
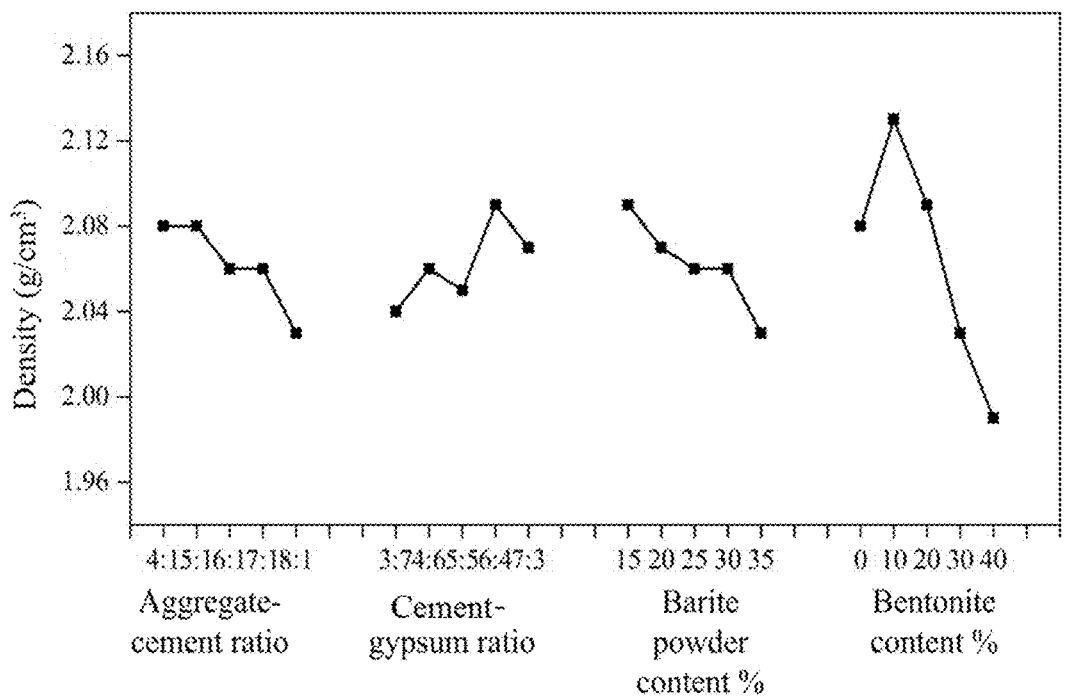
FIG. 3 is a diagram showing sensitivity analysis results of density of the rock similar material satisfying the water-induced strength degradation characteristic according to an embodiment.
Figure 4:
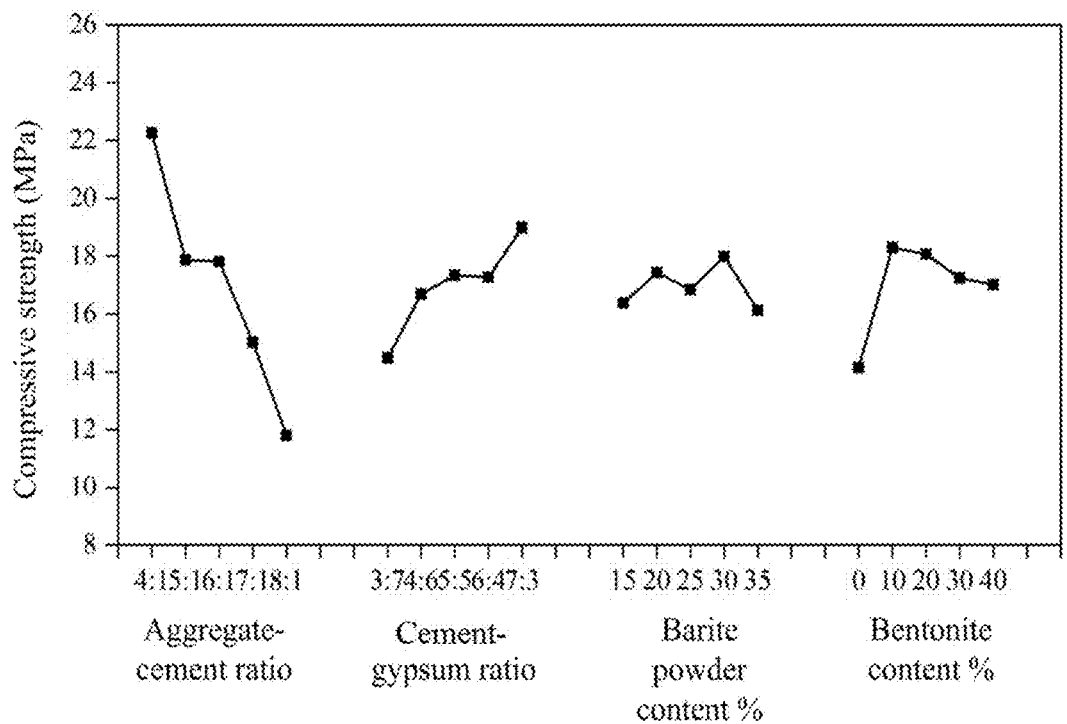
FIG. 4 is a diagram showing sensitivity analysis results of compressive strength of the rock similar material satisfying the water-induced strength degradation characteristic according to an embodiment.
Figure 5:
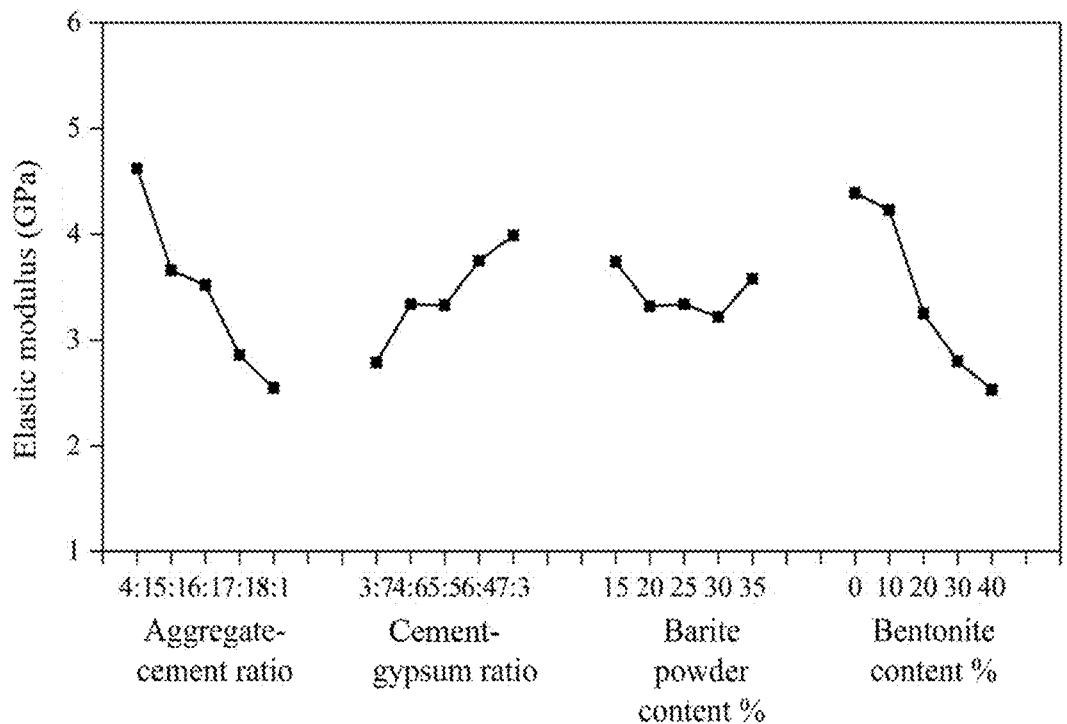
FIG. 5 is a diagram showing sensitivity analysis results of elastic modulus of the rock similar material satisfying the water-induced strength degradation characteristic according to an embodiment.
Figure 6:
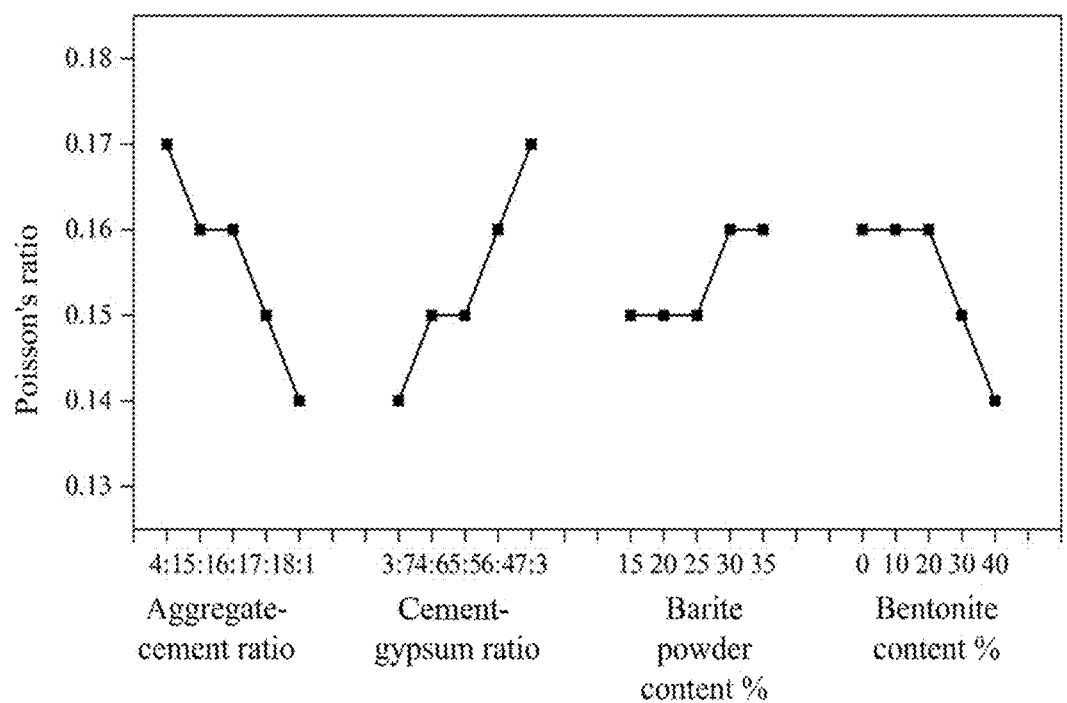
FIG. 6 is a diagram showing sensitivity analysis results of Poisson's ratio of the rock similar material satisfying the water-induced strength degradation characteristic according to an embodiment.
Figure 7:
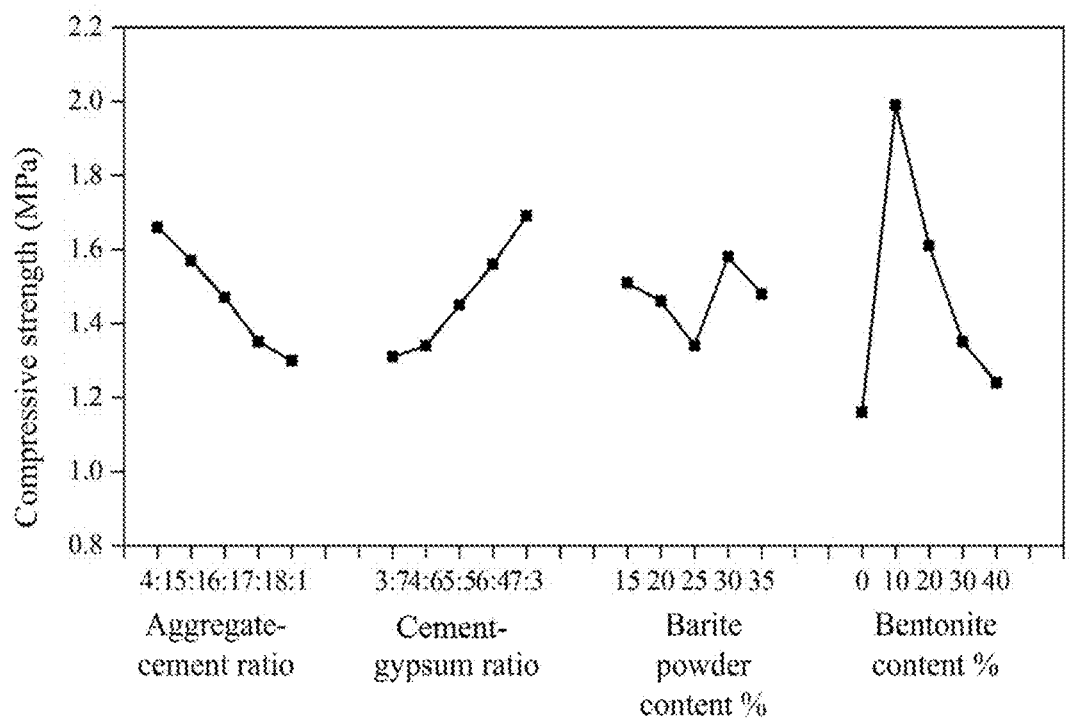
FIG. 7 is a diagram showing sensitivity analysis results of tensile strength of the rock similar material satisfying the water-induced strength degradation characteristic according to an embodiment.
Figure 8:
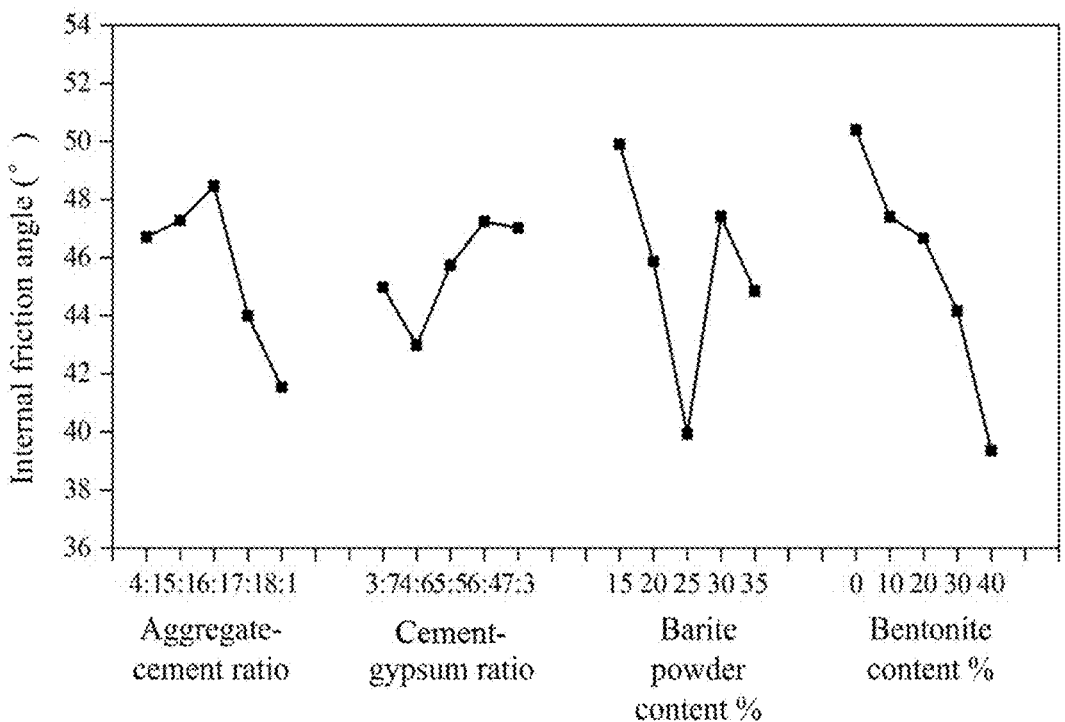
FIG. 8 is a diagram showing sensitivity analysis results of internal friction angle of the rock similar material satisfying the water-induced strength degradation characteristic according to an embodiment.
Figure 9:
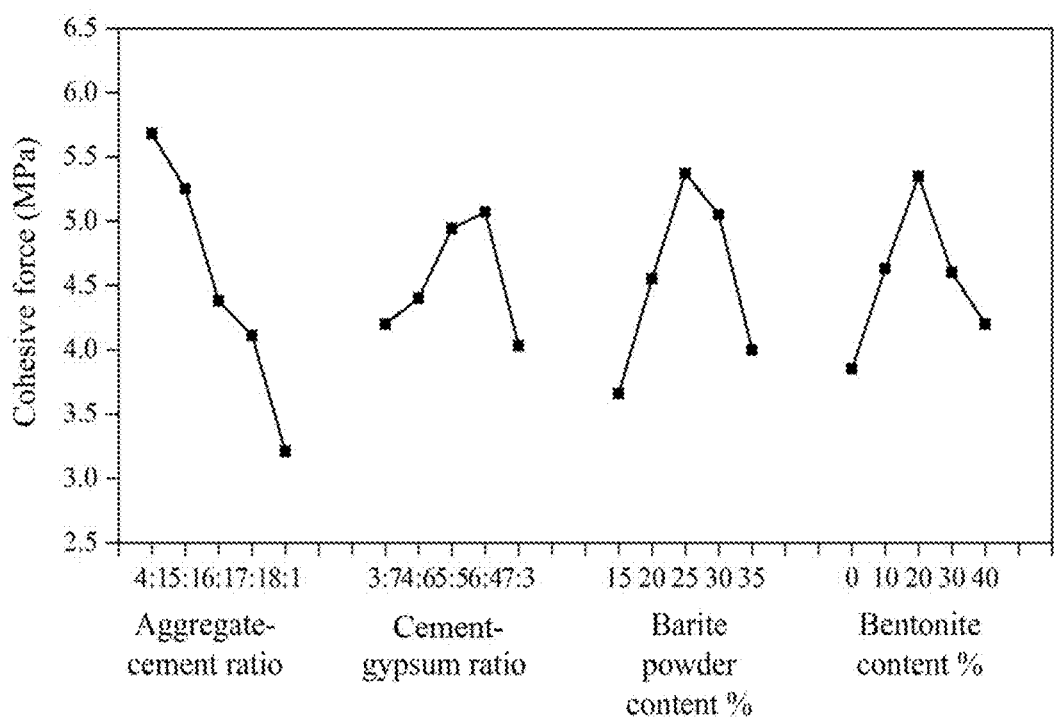
FIG. 9 is a diagram showing sensitivity analysis results of cohesion of the rock similar material satisfying the water-induced strength degradation characteristic according to an embodiment.

According to the compositions of the raw materials in Examples 1 to 20 and Comparative Examples 1 to 5 in Table 1 and the performance test results of the rock similar materials in Table 2, influence factors of performance (a density, compressive strength, an elastic modulus, a Poisson's ratio, a tensile strength, an internal friction angle, and a cohesion) of the rock similar materials satisfying the water-induced strength degradation characteristic were analyzed, and the following four factors were selected: a factor A (aggregate-cement ratio), a factor B (cement-gypsum ratio), a factor C (barite powder content), and a factor D (bentonite content). A specific process of density sensitivity analysis is described by using a density as an example. According to the density test results in Table 2, an average value of levels of factors that affect the density is calculated, and an intuitive analysis diagram illustrating influence of the factors on the density is drawn. Sensitivity analysis results of performance of the rock similar materials satisfying the water-induced strength degradation characteristic are shown in FIG. 3 to FIG. 9. FIG. 3 shows sensitivity analysis results of the density, FIG. 4 shows sensitivity analysis results of the compressive strength, FIG. 5 shows sensitivity analysis results of the elastic modulus, FIG. 6 shows sensitivity analysis results of the Poisson's ratio, FIG. 7 shows sensitivity analysis results of the tensile strength, FIG. 8 shows sensitivity analysis results of the internal friction angle, and FIG. 9 shows sensitivity analysis results of the cohesion.

TABLE 3

Experimental design levels of the rock similar materials satisfying the water-induced strength degradation characteristic

| Level group number | A (aggregate-cement ratio) | B (cement-gypsum ratio) | C (Barite powder content %) | D (Bentonite content %) |
|---|---|---|---|---|
| 1 | 4:1 | 3:7 | 15 | 0 |
| 2 | 5:1 | 4:6 | 20 | 10 |
| 3 | 6:1 | 5:5 | 25 | 20 |
| 4 | 7:1 | 6:4 | 30 | 30 |
| 5 | 8:1 | 7:3 | 35 | 40 |

It can be learned from FIG. 3 that, an increase in the aggregate-cement ratio significantly leads to a decrease in the density of the similar material. A main reason why the density of the similar material is decreased with an increase in the barite powder content is that: when the barite powder content is increased, content of quartz sand in an aggregate is decreased, and the quartz sand content significantly affects the similar material. Therefore, a phenomenon inconsistent with a conventional conclusion occurs.

It can be learned from FIG. 4 that, an increase in the aggregate-cement ratio significantly leads to degradation of the compressive strength of the rock similar material satisfying the water-induced strength degradation characteristic, and an increase in the cement-gypsum ratio can lead to an improvement to a certain extent in the compressive strength of the rock similar material satisfying the water-induced strength degradation characteristic. Relationships between other influence factors and the compressive strength are not quite obvious.

It can be learned from FIG. 5 that, an increase in the aggregate-cement ratio and an increase in the bentonite content significantly lead to a decrease in the elastic modulus of the material, and an increase in the cement-gypsum ratio can lead to an increase in the elastic modulus of the material to a certain extent. Relationship between the barite powder content and the elastic modulus of the similar material is not quite obvious.

It can be learned from FIG. 6 that, an increase in the cement-gypsum ratio significantly leads to an increase in the Poisson's ratio of the material, and an increase in the bentonite content can lead to a decrease in the Poisson's ratio of the material to a certain extent. Relationship between other influence factors and the Poisson's ratio of the test sample is not quite obvious.

It can be learned from FIG. 7 that, with an increase in the aggregate-cement ratio, the tensile strength of the material is degraded. An increase in the cement-gypsum ratio can lead to an improvement in the compressive strength of the material to a certain extent. Relationship between the barite powder content and the tensile strength of the similar material is not quite obvious.

It can be learned from FIG. 8 that, with an increase in the bentonite content, the internal friction angle of the material is decreased. Relationship between other influence factors and the internal friction angle of the test sample is not quite obvious.

It can be learned from FIG. 9 that, with an increase in the aggregate-cement ratio, the cohesion of the material tends to be decreased. Relationship between other influence factors and the cohesion of the test samples is not quite obvious.

The above descriptions are merely preferred embodiments of the present disclosure. It should be noted that those skilled in the art may further make several improvements and modifications without departing from the principle of the present disclosure, but such improvements and modifications should be deemed as falling within the protection scope of the present disclosure.

What is claimed is:

1. A rock similar material satisfying a water-induced strength degradation characteristic, comprising an aggregate, a cementing material, and an additive, wherein the aggregate comprises quartz sand, barite powder, and bentonite, and the cementing material comprises cement and gypsum;
   wherein the bentonite accounts for 15-20% of a total mass of the aggregate and the cementing material;
   the additive comprises a gypsum retarder;
   wherein a mass ratio of the aggregate to the cementing material is 4:1; and
   wherein a mass ratio of the cement to the gypsum in the cementing material is in a range of 3:7 to 7:3.

2. The rock similar material satisfying the water-induced strength degradation characteristic of claim 1, wherein the barite powder accounts for 13-35% of the total mass of the aggregate and the cementing material.

3. The rock similar material satisfying the water-induced strength degradation characteristic of claim 1, wherein a mass fraction of montmorillonite in the bentonite is greater than 80%.

4. The rock similar material satisfying the water-induced strength degradation characteristic of claim 1, wherein the rock similar material has a density of 2.10 g/cm$^3$, a compressive strength of 25.55 MPa, an elastic modulus of 4.60 GPa, a poisson's ratio of 0.16, a tensile strength of 1.70 MPa, an internal friction angle of 33.18°, and a cohesion of 8.94 MPa.

5. A method for preparing the rock similar material satisfying the water-induced strength degradation characteristic of claim 1, comprising the following steps:
   mixing the aggregate, the cementing material, the additive, and water to obtain a mixture, molding the mixture to obtain a molded sample, and curing the molded sample, to obtain the rock similar material satisfying the water-induced strength degradation characteristic.

6. The method of claim 5, wherein the molding is performed at a pressure of 5-20 MPa for 5-10 min.

7. The method of claim 5, wherein the curing is performed at ambient temperature with a humidity of 50-60% for 8-10 days.

8. The method claim 5,
   wherein the barite powder accounts for 13-35% of the total mass of the aggregate and the cementing material.

9. The method of claim 5,
   wherein a mass fraction of montmorillonite in the bentonite is greater than 80%.

* * * * *